United States Patent [19]
Birchler et al.

[11] Patent Number: 5,440,582
[45] Date of Patent: Aug. 8, 1995

[54] METHOD AND APPARATUS FOR DETERMINING SIGNAL USABILITY

[75] Inventors: Mark A. Birchler, Roselle; Steven C. Jasper, Hoffman Estates; Timothy J. Wilson, Schaumburg, all of Ill.

[73] Assignee: Motorola, Inc., Schaumburg, Ill.

[21] Appl. No.: 69,927

[22] Filed: May 28, 1993

[51] Int. Cl.$^6$ .................. H04B 3/46; H04B 17/00
[52] U.S. Cl. .................. 375/227; 375/346; 455/67.1
[58] Field of Search ......... 375/10, 99, 101, 103; 370/13, 17; 455/50.1, 51.1, 52.1, 52.3, 63, 67.1, 67.3, 226.1, 226.2, 226.3

[56] References Cited

U.S. PATENT DOCUMENTS

| | | | |
|---|---|---|---|
| 4,408,322 | 10/1983 | Chadwick et al. | 370/17 |
| 4,835,790 | 5/1989 | Yoshida et al. | 375/10 |
| 5,170,413 | 12/1992 | Hess et al. | 375/100 |
| 5,323,421 | 6/1994 | LaRosa et al. | 375/10 |

Primary Examiner—Stephen Chin
Assistant Examiner—William Luther
Attorney, Agent, or Firm—Daniel C. Crilly; Wayne J. Egan; Timothy W. Markison

[57] ABSTRACT

A receiver that receives a stream of information symbols may detect the usability of the stream of information symbols received as follows. Upon receiving the stream of information symbols, the receiver separates the stream of information symbols into a desired portion and an undesired portion wherein the desired portion is the originally transmitted stream of information symbols and the undesired portion is interference and noise. From the undesired portion and the desired portion, the usability can be determined based on a ratio of the two portions.

7 Claims, 2 Drawing Sheets

METHOD AND APPARATUS FOR DETERMINING SIGNAL USABILITY

FIELD OF THE INVENTION

This invention relates generally to communication systems and, in particular, to a communication system with geographic reuse of communication resources.

BACKGROUND OF THE INVENTION

Communication systems that geographically reuse communication resources are known. These systems allocate a predetermined set of communication resources in one geographic area and reuse the same set of communication resources in one or more other geographic areas. This reuse technique improves communication capacity by minimizing the number of communication resources necessary to provide communication service in a large geographic area comprised of several smaller geographic areas. As is also known, a communication resource may be a frequency carrier, a pair of frequency carriers, a time slot in a time division multiplex (TDM) time frame, or any radio frequency (RF) transmission medium.

Two of the most common communication systems which geographically reuse communication resources are cellular communication systems and trunked mobile communication systems. In both communication systems, allocation of a communication resource begins when a communication unit requests communication service. Based on resource availability and signal usability, a resource controller assigns the communication resource to the communication unit. A communication, such as a conversation or a facsimile transmission, occurs on the communication resource between the communication unit and another communication unit or between the communication unit and a subscriber to a public service telephone network. The communication continues until completion or an interruption in service occurs. Upon conclusion of the communication, the resource controller retrieves the communication resource; thus making the communication resource available for another communication.

An important parameter in identifying an acceptable communication resource is signal usability. In a wireless communication system, the communication resources are typically RF channels which occupy predetermined bandwidths. When information signals are transmitted on the RF channels, undesired channel effects, such as fading and interference, alter the information signals during transmission. Thus, the information signals received by a receiver in the communication unit, or a base station, are corrupted by the undesired channel effects. By ascertaining an indication of the corruption on available communication resources, the least corrupted communication resource may be selected for the communication. This indication of corruption is known as signal usability.

In geographic reuse communication systems, signal usability is typically limited by the quantity of co-channel interference present on the RF channel. Co-channel interference occurs when receivers receive unwanted information signals from neighboring communication units, or base stations, transmitting on the same channel as the desired RF channel. Thus, the signal usability decreases as the co-channel interference increases.

Received signal strength indication (RSSI) and bit error rate (BER) are two common methods of estimating signal usability. In an RSSI estimate, the receiver measures the level of a received signal on the desired RF channel. This measurement provides a summation of signal levels (i.e. $C+I+N$) including the desired information signal (C), the co-channel interference (I), and the noise (N) on the desired RF channel. Although this technique accurately estimates the level of the received signal, it cannot distinguish between the desired information signal and signals due to co-channel interference. Thus, an acceptable RSSI measurement may provide unacceptable signal usability due to a high level of co-channel interference. Alternatively, BER measurements provide accurate estimates of signal usability, but in geographic areas where error rates are low, multiple measurements and excessive averaging times may be required to obtain the accurate estimates. Measurement periods as long as ten to fifty seconds may be necessary to obtain accurate BER data.

As briefly mentioned above, fading is an additional undesired channel effect that may alter the transmitted information signal. Fading occurs due to multiple reflections of the desired information signal during transmission over the RF channel. These reflections are typically caused by unintentional reflecting of the transmitted information signal from obstacles in its path, such as buildings and mountains, and may produce multiple modified replications of the transmitted information signal., each introducing various amplitude and phase alterations of the original signal in each new signal path. All of the transmitted information signal replicas form a composite information signal at the input to a receiver. The signal usability of the composite signal is dependant on the type of fading.

Two types of fading generally encountered are flat fading and frequency selective fading. In a digital transmission, flat fading occurs when the maximum differential time delay between each new signal path is much less than a symbol period. As is known, methods for estimating the flat fading of an RF channel exist and are used to minimize the degradation in signal usability attributed to flat fading. Frequency selective fading occurs when the maximum differential time delay between each new signal path is comparable to or greater than the symbol period. Frequency selective fading may also degrade signal usability. Recent technological advances have allowed signal quality to be estimated in the presence of frequency selective fading. For a detailed discussion of a method for measuring signal quality that accounts for frequency selective fading refer to U.S. Pat. No. 5,170,413, entitled "Control Strategy For Reuse System Assignments And Handoff", assigned to Motorola Inc. While this technology provides many advantages, it does not address the technological concern of estimating signal usability based on a measured approximation of co-channel interference and noise.

Therefore, a need exists for a method and apparatus that determine signal usability based on a determination of RF channel interference.

DESCRIPTION OF A PREFERRED EMBODIMENT

Generally, the present invention provides a method and apparatus for determining a level of usability of a received signal. The received signal comprises a summation of a desired portion and an undesired portion. Typically, the desired portion includes an original transmitted signal, modified in amplitude and phase, and the undesired portion includes noise and interference. In the present invention, a receiver extracts a representation of the desired portion from the received signal and utilizes it to obtain a representation of the received signal's undesired portion. The receiver then calculates the average power contained in each portion and forms the ratio of these two powers. This ratio, which is commonly referred to as the carrier to interference plus noise ratio, or C/(I+N), provides an indicia of the usability of the received signal.

Figure 1:
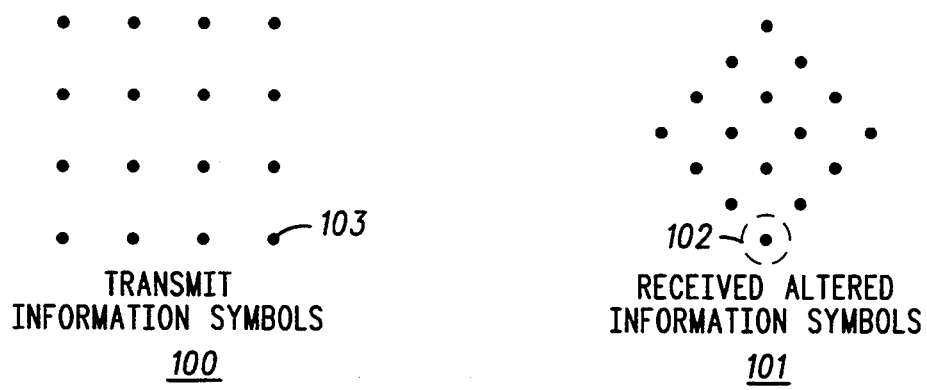
FIG. 1 illustrates constellation depictions of transmitted and received altered information symbols in accordance with the present invention.

The present invention can be more fully described with reference to FIGS. 1-3. FIG. 1 illustrates a transmitted information symbol pattern 100 and a received altered information symbol pattern 101. The two-dimensional symbol patterns illustrated in FIG. 1 are typical of a digital transmission system using 16-ary quadrature amplitude modulation (QAM), however, symbol patterns corresponding to alternate digital modulation schemes, such as quaternary phase shift keying (QPSK) and differential QPSK, are also commonly used in the art.

In a digital transmission system, the transmitter emits a stream of information symbols, wherein each information symbol is a particular value chosen from a discrete set of possible values contained in the transmitted information symbol pattern 100. For example, at a particular symbol time, the transmitter may transmit the information symbol 103 indicated in the transmitted information symbol pattern 100. The transmitted stream of information symbols propagates from the transmitter to a receiver over a communication resource, such as an RF transmission channel. The information symbol stream received by the receiver is typically altered due to undesired effects encountered during transmission over the transmission channel.

The transmitted information symbol 103 is altered in two ways. First, the communication resource modifies the symbol in amplitude and phase, in effect rotating and scaling the transmitted information symbol pattern 100 to produce the received altered information symbol pattern 101. The exact amount of rotation and scaling introduced by the communication resource generally changes in a random manner as a function of time due to the effects of Rayleigh, or flat, fading. Secondly, the communication resource adds noise and interference to the transmitted information symbol 103, such that a received information symbol is displaced by a certain random amount. In a multiple site communication system that utilizes geographic reuse of its communication resources, the interference arises from the use of the communication resource by other transmitters in the system. The noise results from various sources such as thermal noise and environmental noise. The multiple site communication system is typically designed to insure that the noise and interference introduced by the transmission channel remains small compared to the transmitted information symbol 103, thus in normal operating conditions, the received information symbol lies, with high probability, in a region 102 near its corresponding transmitted information symbol.

As a result of the alterations introduced by the communication resource, the received information symbol stream comprises desired and undesired portions. The desired portion, which includes the information symbol stream originally transmitted by the transmitter, is the portion that is rotated and scaled due to fading. The undesired portion is the interference and noise added to the transmitted symbol stream by the communication resource.

Figure 2:
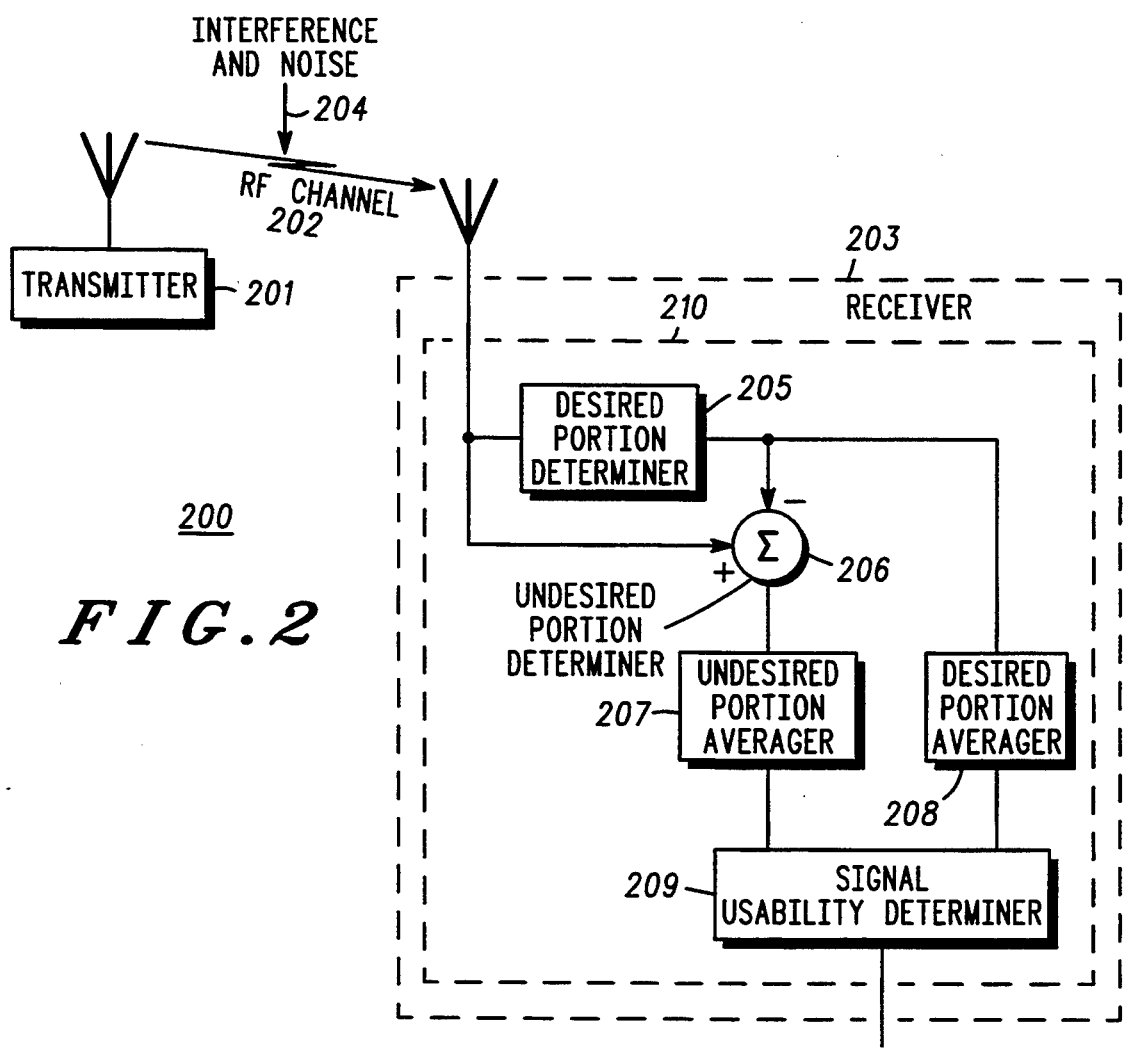
FIG. 2 illustrates a block diagram depiction of a communication system that includes a receiver in accordance with the present invention.

FIG. 2 illustrates a communication system 200 that includes a transmitter 20 1, an RF channel 202, a receiver 203, and noise and interference 204. The transmitter 201 may be included in a base station or communication unit, such as a two way radio or radiotelephone. Similarly, the receiver 203 may also be included in a communication unit or a base station. As is known, communication units transceive information, via the RF channel 202 or a communication resource, with the base station. The manner in which these communications are established is known and not germane to this discussion.

Signals, such as the stream of information symbols, are transmitted by the transmitter 201 over the RF channel 202 or a communication resource, where they encounter noise and interference 204, and are received by the receiver 203. The received signals, which include a representation of the transmitted signals summed with the noise and interference 204, enter an apparatus 210 within the receiver 203 that comprises a desired portion determiner 205, an undesired portion determiner 206, and a signal usability determiner 209. The desired portion determiner 205 accepts the received signals and determines the desired portion from them. In this embodiment, the desired portion includes an estimate of the representation of the transmitted signals and is obtained by converting the received signal from analog to digital form and applying digital signal processing. The undesired portion determiner 206 is operably coupled to the desired portion determiner 205 and accepts the received signals and the desired portion from which it determines an undesired portion of the received signals. The undesired portion determiner 206 may comprise a subtractor that subtracts the desired portion from the received signals to determine the undesired portion. The signal usability determiner 209 receives the desired and undesired portions from the desired portion determiner 205 and the undesired portion determiner 206, respectively, and determines an indicia of usability of the received signals based on them. As briefly mentioned above, the indicia of usability generally includes evaluating a ratio of the desired portion to the undesired portion.

The apparatus 210 may also include an undesired portion averager 207 and a desired portion averager 208 which accept the undesired and desired portions, respectively, and produce corresponding averages of them. The signal usability determiner 209 utilizes the averages produced by the undesired portion averager 207 and the desired portion averager 208 to determine the indicia of usability. Typically, the averages produced by the undesired and desired portion averagers 207 and 208 are average signal powers determined by averaging the squared magnitude of the complex undesired and desired portions, respectively; thus, the indicia of usability provided by the signal usability determiner 209 approximates the aforementioned carrier to interference plus noise ratio. The apparatus 210 within the receiver 203 may be a digital signal processing (DSP) unit that includes software routines which function as the undesired and desired portion determiners 205 and 206, the undesired and desired portion averagers 207 and 208, and the signal usability determiner 209.

Figure 3:
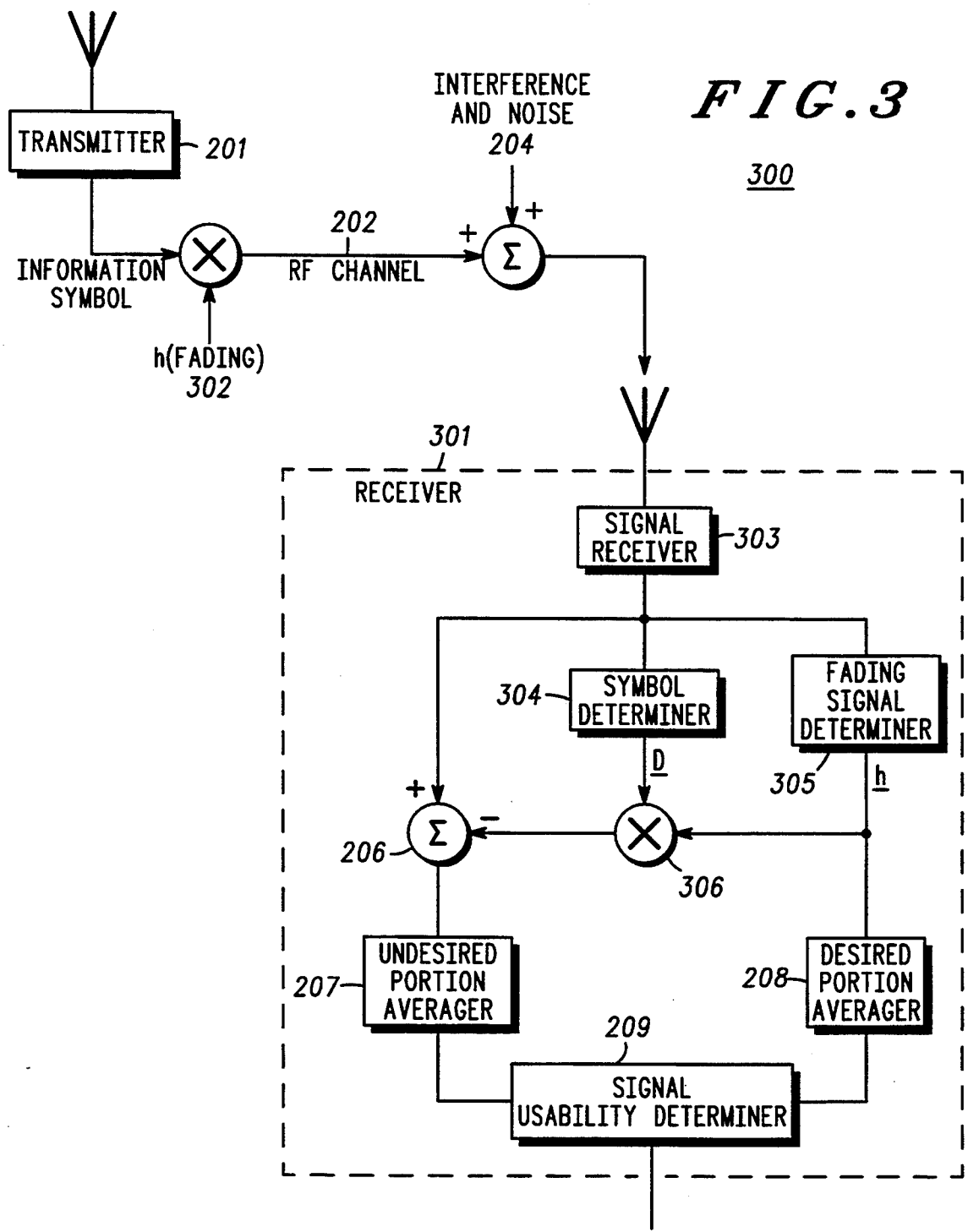
FIG. 3 illustrates an alternative block diagram depiction of a communication system that includes a receiver in accordance with the present invention.

FIG. 3 illustrates a communication system 300 that includes the transmitter 201, the RF channel 202, and a receiver 301. The transmitter 201 transmits a stream of unaltered information symbols over the RF channel 202 to the receiver 301. In the RF channel 202, the unaltered information symbol stream encounters multiplicative effects of fading 302 and additive effects of noise and interference 204 resulting in a stream of altered information symbols at the input to the receiver 301. For example, each information symbol of the unaltered information symbol stream may be represented by a discrete value D. The effects of fading 302 in the RF channel 202 are modeled by multiplying each unaltered information symbol by a fading signal h and the effects of noise and interference 204 are represented by adding an interference signal I to each faded information symbol. Upon completing their transmission through the RF channel 202, the composite stream of information symbols present at the receiver's input forms the altered stream of information symbols. Each symbol of the altered stream may be mathematically denoted by $Dh+I$. Therefore, each symbol of the altered stream comprises the sum of a desired portion and an undesired portion, where the desired portion is denoted $Dh$ and the undesired portion is denoted $I$.

The receiver 301, which comprises a signal receiver 303, a symbol determiner 304, a fading signal determiner 305, a desired portion determiner 306, the undesired portion determiner 206, and the signal usability determiner 209, is used to process the altered stream and provide a determination of altered stream usability. The altered stream of information symbols enters the receiver 301 through an antenna and propagates to an input of the signal receiver 303. The signal receiver 306 amplifies, filters, and converts the altered stream from analog to digital form. The digital representation of the altered stream is provided to inputs of the symbol determiner 304 and the fading signal determiner 305 wherein a representation of each unaltered information symbol D and a representation of the fading signal h are respectively determined. For a detailed discussion on the technique of determining the representations of the fading signal and each unaltered information symbol refer to co-pending U.S. patent application Ser. No. 07/783,289, entitled "Communication Signal Having A Time Domain Pilot Component", assigned to Motorola Inc.

The representation of each unaltered information symbol D and the representation of the fading signal h are submitted to the desired portion determiner 306 where a desired portion of the altered stream is determined based on its two input representations. For example, the desired portion determiner 306 may be a digital multiplier that provides an output signal Dh. The undesired portion determiner 206 accepts inputs from the desired portion determiner 306 and the signal receiver 303 and manipulates them to produce an undesired portion of the altered stream. As previously discussed with reference to FIG. 2, the undesired portion determiner 206 may comprise a subtractor that subtracts the desired portion Dh from each symbol of the altered stream $Dh+I$ to produce the undesired portion $Dh+I-Dh$. Provided the representations of each unaltered information symbol D and the fading signal h are accurate, the undesired portion approximates the interference signal I. The outputs of the fading signal determiner 305 and the undesired portion determiner 206 are provided to the signal usability determiner 209 for determination of an indicia of usability of the altered stream. The indicia of usability is determined by evaluating the ratio of the fading signal representation to the undesired portion, i.e. h/I.

The receiver 301 may also include the undesired portion averager 207 and the desired portion averager 208 which accept the undesired portion and the representation of the fading signal, respectively, and produce averages of their respective inputs. The average produced by the desired portion averager 208 may include scaling an average of the fading signal by a predetermined average of each unaltered information symbol. The averaged outputs of the undesired portion averager 207 and the desired portion averager 208 are delivered to the signal usability determiner 209 for determination of the received signal usability. As previously discussed with reference to FIG. 2, the averages produced by the undesired and desired portion averagers 207 and 208 are typically average signal powers; thus, the indicia of usability provided by the signal usability determiner 209 approximates the carrier to interference plus noise ratio. With this technique, the indicia of signal usability (C/(I+N)) can be determined within five seconds.

The present invention provides a method and apparatus for determining an indication of received signal usability. With the present invention, a receiver in a multiple site frequency reuse communication system can rapidly and accurately evaluate the usability of a received signal, which is an important procedure for system operations such as channel assignment and handoff. The method of the present invention provides a much better indication of received signal usability compared to a received signal strength measurement since it differentiates between desired and undesired portions of the received signal, whereas the received signal strength measurement does not. Further, the method of the present invention provides a more rapid, but equivalently accurate, indicia of received signal usability compared to a bit error rate measurement, especially in geographic areas of low error rates, which results in improved operation of the multiple site communication system.

We claim:

1. In a communication system that includes a plurality of communication units, a limited number of communication resources that are transceived by a plurality of base stations, and a plurality of sites, wherein the limited number of communication resources are distributed and reused throughout the plurality of sites, wherein each of the plurality of communication units includes a receiver and a transmitter, and wherein each of the plurality of base stations includes a receiver and a transmitter, a method for determining usability of received signals, the method comprises the steps of:

a) transmitting, by a transmitter of either a first communication unit or a first base station, a stream of information symbols to produce a symbol stream, wherein each information symbol of the symbol stream is one of a predetermined set of discrete values;

b) receiving, by at least one receiver of either a second communication unit or a second base station, a stream of altered information symbols to produce an altered stream, wherein each altered information symbol of the altered stream corresponds to one of the information symbols of the symbol stream multiplied by a fading signal and summed with an interference signal;

c) determining, by the at least one receiver, a representation of the fading signal from the altered stream to produce a determined fading signal;

d) determining, by the at least one receiver, a representation of the information symbols in the symbol stream from the altered stream to produce determined information symbols;

e) determining, by the at least one receiver, a desired portion of the altered stream based on the determined information symbols and the determined fading signal;

f) determining, by the at least one receiver, an undesired portion of the altered stream based on the desired portion of the altered stream and the altered stream; and g) providing, by the at least one receiver, an indicia of usability of the altered information symbols based on the desired portion of the altered stream and the undesired portion of the altered stream.

2. In the method of claim 1, the determination of step (e) comprises multiplying the determined fading signal with each determined information symbol to obtain the desired portion of the altered stream.

3. In the method of claim 2, the determination of step (f) comprises subtracting the desired portion of the altered stream from the altered stream to determine the undesired portion of the altered stream.

4. In the method of claim 1, the providing the indicia of usability of step (g) comprises averaging a norm of the desired portion of the altered stream to produce a desired average; averaging a norm of the undesired portion of the altered stream to produce an undesired average; and determining a ratio of the desired average to the undesired average.

5. A receiver, wherein the receiver is included in either a communication unit or a base station in a communication system, the receiver comprises:

a signal receiver that receives a stream of altered information symbols, wherein each altered information symbol in the stream of altered information symbols is a resultant of an unaltered information symbol multiplied by a fading signal and summed with an interference signal;

a fading signal determiner, operably coupled to the signal receiver, wherein the fading signal determiner determines a representation of the fading signal to produce a determined fading signal;

a symbol determiner, operably coupled to the signal receiver, wherein the symbol determiner determines a representation of each of the unaltered information symbols to produce determined information symbols;

a desired portion determiner, operably coupled to the fading signal determiner and the symbol determiner, wherein the desired portion determiner determines a desired portion of the stream of altered information symbols based on the determined fading signal and the determined information symbols;

an undesired portion determiner, operably coupled to the desired portion determiner and the signal receiver, wherein the undesired portion determiner determines an undesired portion of the stream of altered information symbols based on the desired portion of the stream of altered information symbols and the stream of altered information symbols; and a signal usability determiner, operably coupled to the desired portion determiner and the undesired portion determiner, wherein the signal usability determiner determines an indicia of usability of the altered information symbols based on the desired portion of the stream of altered information symbols and the undesired portion of the stream of altered information symbols.

6. In the receiver of claim 5, the undesired portion determiner comprises a subtractor that subtracts the desired portion of the stream of altered information symbols from the stream of altered information symbols to determine the undesired portion of the stream of altered information symbols.

7. The receiver of claim 5 further comprises a desired portion averager, operably coupled to the desired portion determiner and the signal usability determiner, and an undesired portion averager, operably coupled to the undesired portion determiner and the signal usability determiner, wherein the signal usability determiner uses averages produced by the desired portion averager and the undesired average portion to produce a ratio of the desired portion of the stream of the altered information symbols to the undesired portion of the stream of the altered information symbols to determine the indicia of usability of the altered information symbols.

* * * * *